(12) United States Patent
Vartiainen

(10) Patent No.: US 9,303,894 B2
(45) Date of Patent: Apr. 5, 2016

(54) AIR FILTER

(75) Inventor: Seppo Vartiainen, Mikkeli (FI)

(73) Assignee: JEVEN OY, Mikkeli (FI)

( * ) Notice: Subject to any disclaimer, the term of this patent is extended or adjusted under 35 U.S.C. 154(b) by 0 days.

(21) Appl. No.: 14/112,101

(22) PCT Filed: Feb. 22, 2012

(86) PCT No.: PCT/FI2012/050176
§ 371 (c)(1),
(2), (4) Date: Oct. 16, 2013

(87) PCT Pub. No.: WO2012/143600
PCT Pub. Date: Oct. 26, 2012

(65) Prior Publication Data
US 2014/0041344 A1 Feb. 13, 2014

(30) Foreign Application Priority Data

Apr. 20, 2011 (FI) .................................... 20115385

(51) Int. Cl.
*F24F 13/28* (2006.01)
*B01D 45/14* (2006.01)
(Continued)

(52) U.S. Cl.
CPC ................ *F24F 13/28* (2013.01); *B01D 45/14* (2013.01); *B01D 46/0056* (2013.01);
(Continued)

(58) Field of Classification Search
CPC .... B01D 45/14; B01D 46/0056; B01D 46/10; B01D 50/00; B01D 2279/50; F24F 13/06; F24F 13/28; F24F 3/1603; F24F 2003/1614

USPC ......................................................... 55/385.2
See application file for complete search history.

(56) References Cited

U.S. PATENT DOCUMENTS 297,028 A * 4/1884 Stainfield ........................ 55/403
1,319,059 A * 10/1919 Funk ............................... 55/404
(Continued)

FOREIGN PATENT DOCUMENTS

CN      101 865 482 A    10/2010
CN      202 052 448 U    11/2011
(Continued)

OTHER PUBLICATIONS

CN 101865482 Translated by EPO and Google, Dec. 5, 2014, all pages.*

(Continued)

*Primary Examiner* — Amber R Orlando
*Assistant Examiner* — Britanny Precht
(74) *Attorney, Agent, or Firm* — Young & Thompson

(57) ABSTRACT

An air filter (1) which is intended for an air conditioning system, includes a disc type filter element (2) and a power unit (3), preferably an electric motor, which is connected to the filter element for rotating the same. The filter element is arranged in connection with a ventilation duct (4), such that it is placed outside an aperture (4a) of the ventilation duct (4) at a first distance therefrom, and such that it is concentric with the ventilation duct. The ventilation duct is supplied by way of the aperture with air (A) cleaned by the air filter. The air filter further includes a ring type collar (5), which is arranged outside the aperture of the ventilation duct at a second distance therefrom concentrically with the ventilation duct. The collar is adapted to widen towards the aperture (4a) and is most preferably in the shape of a truncated cone.

20 Claims, 2 Drawing Sheets

(51) Int. Cl.
*B01D 46/00* (2006.01)
*B01D 46/10* (2006.01)
*B01D 50/00* (2006.01)
*F24F 3/16* (2006.01)
*F24F 13/06* (2006.01)

(52) U.S. Cl.
CPC ............... *B01D 46/10* (2013.01); *B01D 50/00* (2013.01); *F24F 3/1603* (2013.01); *F24F 13/06* (2013.01); B01D 2279/50 (2013.01); F24F 2003/1614 (2013.01)

(56) References Cited

U.S. PATENT DOCUMENTS

| | | | | |
|---|---|---|---|---|
| 2,006,244 | A | * | 6/1935 | Kopsa ............................. 55/403 |
| 2,019,181 | A | * | 10/1935 | Franzmeier .................. 210/456 |
| 2,127,746 | A | * | 8/1938 | Logan .............................. 55/403 |
| 2,560,874 | A | * | 7/1951 | Kelso .............................. 55/408 |
| 3,438,503 | A | * | 4/1969 | Carpenter .................... 210/396 |
| 3,710,540 | A | * | 1/1973 | Stansell .......................... 55/473 |
| 4,708,797 | A | * | 11/1987 | Baur et al. .................... 210/330 |
| 5,707,517 | A | * | 1/1998 | Rolchigo et al. ............. 210/232 |
| 6,004,365 | A | | 12/1999 | Fiacco |
| 6,217,637 | B1 | * | 4/2001 | Toney et al. .................... 95/277 |
| 6,372,005 | B1 | | 4/2002 | Fiacco |
| 6,514,304 | B2 | | 2/2003 | Fiacco |
| 2002/0139097 | A1 | * | 10/2002 | Brilmaker ...................... 55/456 |

FOREIGN PATENT DOCUMENTS

| | | |
|---|---|---|
| EP | 2 275 187 A2 | 1/2011 |
| FR | 2 518 894 A1 | 7/1983 |
| WO | 99-20369 | 4/1999 |

OTHER PUBLICATIONS

CN 20205448U Translated by EPO and Google, Dec. 5, 2014, all pages.*
Sigma Aldrich, "Particle Size Conversion" All pages https://web.archive.org/web/20090213221854/http://sigmaaldrich.com/chemistry/stockroom-reagents/learning-center/technical-library/particle-size-conversion.html.*
FI Search Report, dated Feb. 17, 2012, from corresponding FI application.
International Search Report, dated Jun. 5, 2012, from corresponding PCT application.
Supplementary European search report, dated Nov. 30, 2015; Application No. 12 77 3740.

* cited by examiner

AIR FILTER

BACKGROUND OF THE INVENTION

1. Field of the Invention

The invention relates to an improved air filter as defined in the preamble of claim 1.

2. Description of the Related Art

Prior known from the present Applicant's earlier European patent application EP 2275187 is an air filter intended for an air conditioning system, comprising a disc-like filter element and a power unit, preferably an electric motor, that is connected to the filter element for rotating it. The filter element is arranged in connection with a ventilation duct, such as outside an aperture of the ventilation duct, at a distance therefrom and concentrically with the ventilation duct. Air is supplied by way of the air filter and the aperture into the ventilation duct.

A problem with the air filter is that the rotating filter element spreads a major portion of the impurities back in the air, thus circulating the same e.g. in indoor air.

One option for solving the problem is to provide around the air filter a collecting tank, such as disclosed in the above-mentioned European patent application. This provides a capability of collecting and removing liquid impurity droplets in and out of the collecting tank, but small solid particles swirl within the air flows of the collecting tank and the filter element, and spread back into indoor air. In the worst case, at least some of the filter element's holes are clogged by small impurity particles

BRIEF SUMMARY OF THE INVENTION

It is an object of the invention to eliminate problems related, among others, to the above-presented air filter. Another object of the invention is to provide a new improved air filter by means of which the air being conveyed in a ventilation system can be effectively cleaned of small solid particles.

The improved air filter according to the invention is characterized by what is presented in claim 1. Preferred embodiments of the invention are presented in the dependent claims.

The invention relates to an air filter which is intended for an air conditioning system, comprising a disc type filter element and a power unit, preferably an electric motor, which is connected to the filter element for rotating the same, said filter element being arranged in connection with a ventilation duct in such a way that the filter element is placed outside an aperture of the ventilation duct at a first distance therefrom and concentrically with the ventilation duct, said ventilation duct being supplied by way of the aperture with air to be cleaned. According to the invention, the air filter further comprises a ring type collar, which is arranged outside the aperture of the ventilation duct at a second distance therefrom concentrically with the ventilation duct.

In a first preferred embodiment of the invention, one end of the collar has a diameter which is equal to or larger than the diameter of the ventilation duct, especially that of the aperture.

In a second preferred embodiment of the invention, the collar is adapted to widen towards the aperture.

In a third preferred embodiment of the invention, the collar is in the shape of a truncated cone.

In a fourth preferred embodiment of the invention, the first distance exceeds the second one, the filter element being arranged inside an area/space defined by the collar.

A benefit of the invention is the effective removal of solid particles, such as dust, from the air to be exhausted. The invention is particularly effective when there is a large amount of impurities; the air filter is not clogged by impurities but, instead, the latter can be conveyed along with the air flow through a gap between the collar and the ventilation duct radially away from the filter element.

Another benefit of the invention is that the filter element can be made of any air permeable filter material.

A further benefit of the invention is that the air filter is easy to clean.

A benefit of the invention is also a simple and light structure.

BRIEF DESCRIPTION OF THE DRAWINGS

The invention and its other advantages will now be described in more detail with reference to the accompanying drawings, in which.

In the figures, like parts are designated by like reference numerals.

DETAILED DESCRIPTION OF THE PREFERRED EMBODIMENTS

Figure 1:
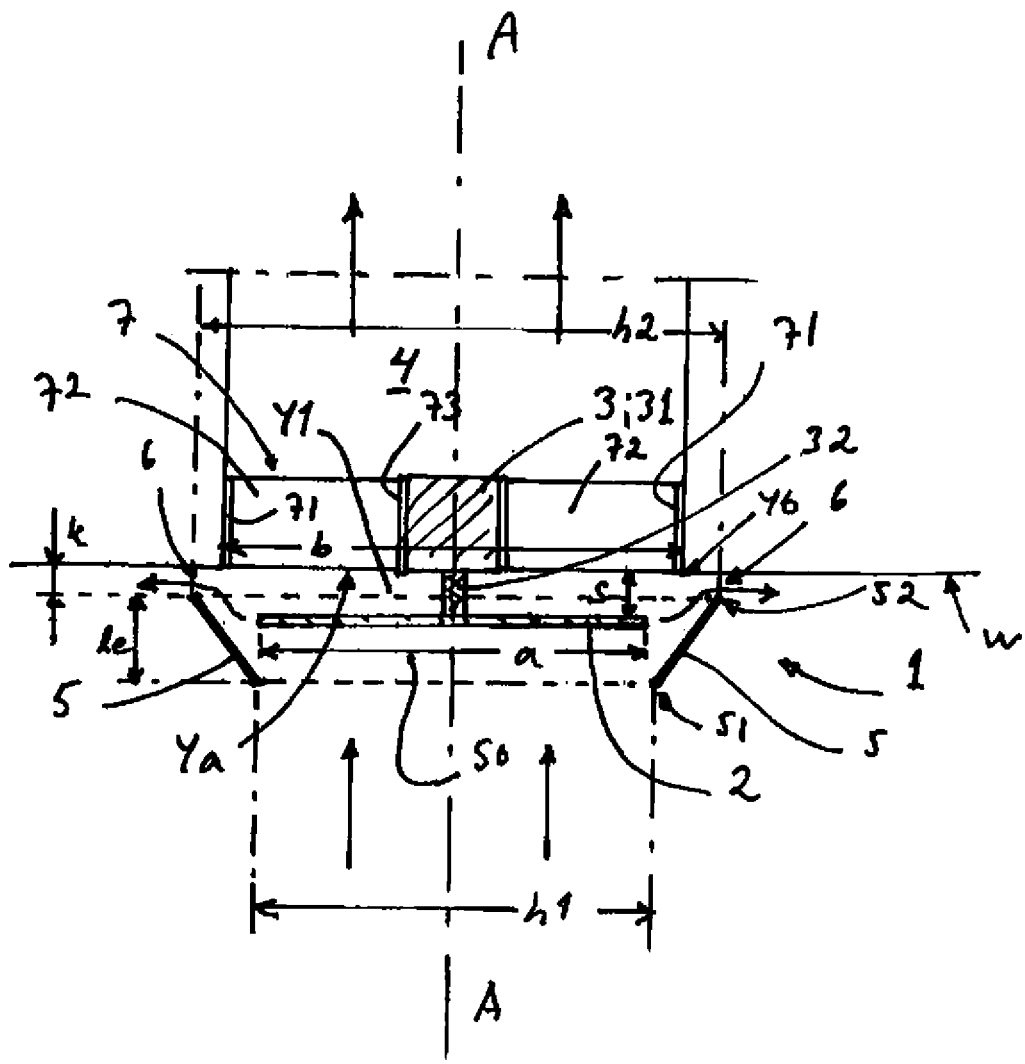
FIG. 1 shows in a partial cross-section an air filter of the invention, which is arranged in connection with a ventilation duct.

One preferred air filter for an air conditioning system is illustrated in FIG. 1. An air filter 1 comprises a disc type filter element 2 and a power unit 3, which is connected to the filter element 2 for rotating the same. The filter element 2 is arranged in connection with a ventilation duct 4. In this exemplary embodiment, the filter element 2 is made of a perforated plate 20.

In the embodiment of FIG. 1, the power unit 3, preferably an electric motor 31, has its rotating shaft 32 attached to the middle of the disc type filter element 2, such as a circular perforated plate 20. The power unit 3, the perforated plate 20, and thereby the entire air filter 1, are secured by means of fasteners 10 to the ventilation duct 4, preferably on a center axis A-A of the ventilation duct. This makes it concentric with the ventilation duct 4.

The air filter's 1 filter element 2, such as the perforated plate 20, is arranged in connection with the ventilation duct 4, in this case in connection with an aperture 4a or outlet of the ventilation duct, such that it is located outside the aperture 4a at a small distance s therefrom in such a way that a space or gap 41 defined by the first distance s is at the same time established between an edge 4b of the outlet 4a and a wall w or the like surface. In this exemplary embodiment, indoor air is to be conveyed out from indoor space by way of the exhaust air duct 4.

In one preferred embodiment, the air filter 1 has its fasteners 7 comprising a first fastening bush or pipe 71, in the middle of which is secured by suitable arms 72, such as four arms spaced at 90 degrees from each other, a second fastening bush or pipe 73, inside which the power unit 3, such as the electric motor 31, is fitted and secured. The first fastening bush 71 has a diameter that enables its fitting inside the ventilation duct 4 and its propping against an inside wall of the ventilation duct 4, to which it can be clamped in place (and unclamped and released, respectively). In a plane perpendicular to the center axis A-A of the ventilation duct 4 and to the air flow direction, the arms 72 are relatively small in terms of their surface area and compliant to the flow, such that the air drag caused by the arms on the air flow in the duct is slight. It is obvious that there are also other per se known ways of implementing the fasteners 7.

In addition, the air filter 1 according to the invention comprises a ring type collar 5. The collar 5 is arranged outside the aperture 4a of the ventilation duct 4 at a second distance k from the aperture 4a or from a plane of the aperture or a wall or some other structure. Hence, between the collar 5 and the aperture 4a of the ventilation duct 4, particularly the edge 4b of the aperture, is established an annular gap 6 whose width is said second distance k. The collar 5 is fitted concentrically in the ventilation duct 4, particularly with respect to the aperture 4a and thereby the filter element 2; 20. Thus, the ventilation duct 4, particularly its aperture, has its center axis A-A coinciding with a perpendicular center axis of both the filter element 2, such as the perforated plate 20, and the collar 5.

The collar 5 has an open space 50 in its interior from the center axis A-A all the way to the collar. Across this space 50 and through the rotating filter element 2; 20 flows the air into the ventilation duct 4 by way of its aperture 4a, and at the same time also by way of the gap 6, away from the air filter 1. The rotating filter element 2; 20 is arranged within a space defined jointly by the collar 5 and the aperture 4a.

In a preferred embodiment of the invention, the collar 5 is adapted to widen from a first end 51 to a second end 52 towards the ventilation duct 4, particularly towards the aperture 4a. The first end 51 of the collar 5 has a diameter h1 thereby smaller than a diameter h2 of the second end 52. The collar 5 has its second end 52 close to the ventilation duct aperture 4a, i.e. at the second distance k from the aperture 4a or from a plane tangential to the aperture 4a. Respectively, the collar 5 has its first end 51 away from the aperture 4a by a distance which is the sum of the collar's width le and the second distance k. Hence, between the second end 52 of the collar and the aperture 5a of the ventilation, or between a corresponding plane and the edge 4b of the aperture, lies an annular gap 6 whose width is said second distance k.

In a preferred embodiment of the invention, the second end 52 of the collar 5 has its diameter h2 equal to or larger than a diameter b of the ventilation duct 4, especially that of the aperture 4a. This enables providing the annular gap 6 along a periphery of the aperture 4a, i.e. along the edge 4b of the aperture, and outside the aperture, whereby the tangential air flow produced by the rotating filter element can be assuredly directed outside the ventilation duct 4, especially the aperture 4a.

In a preferred embodiment of the invention, the collar 5 is in the shape of a truncated cone.

In the most preferred embodiment of the invention, the filter element 2; 20 and the collar 5 are arranged relative to each other in such a way that a distance of the filter element 2; 20 from the aperture 4a, i.e. the first distance s, is larger than a distance of the collar from the aperture 4a, i.e. the second distance k. As a result, the filter element 2; 20 is disposed in the space 50 defined by the collar 5, i.e. inside the collar 5.

Figure 2:
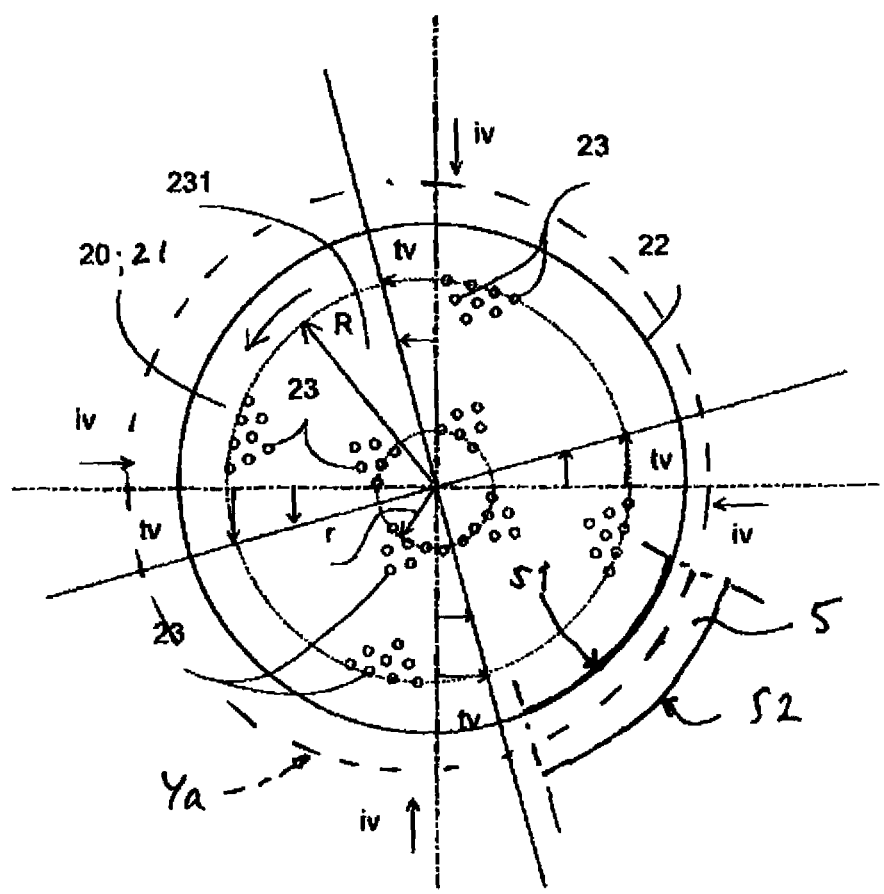
FIG. 2 shows in a partial front view cross-section the air filter of FIG. 1.

In principle, the air filter 1 works as follows. The filter element 2, such as the perforated plate 20, is driven in rapid rotation, such as e.g. 500-3000 revolutions/minute, by the power unit 3, such as the electric motor 31, whereby, with the ventilation system being in operation at the same time, air is flowing through the holes of the filter element 2 into the ventilation duct 4 and, at the same time, air is flowing by way of the gap 6 away from the air filter. The airborne impurities, such as particles, collide partly with the edges of the rotating filter element's 2 holes 23 and partly with an air cushion generated by the rotating filter element. The air cushion generated by the rotating filter element consists of a tangential air flow tv (cf. FIG. 2), along which the impurities proceed by virtue of a centrifugal force radially towards a periphery 22 of the filter element 2 and fling out of the gap 6 away from the filter element. Since the tangential air flow, which is generated by the rotation of the filter element 2, particularly the perforated plate 20, in the proximity of the periphery of the filter element 2 or within the confines of a space 41, is more powerful than a bypass flow iv generated by the suction of exhaust air in this particular area, the result will be a sealing flow in the peripheral area of the rotating filter element 2, preventing the bypass flow of unpurified air by way of the gap 41 into the exhaust air duct 4. Hence, the impurities are not allowed past the filter element 2; 20 into the ventilation duct 4. On the other hand, the impurities—at least some of them—adhere to and accumulate on the filter element and must be periodically removed therefrom.

Regarding the air flow coming in through an opening at the first end 51 of the collar 5, the amount passing by way of the gap 6 is in the order of 5-20% of the total air flow, while the rest 95-80% passes through the filter element 2; 20 and travels in a purified form along the ventilation duct 4.

The collar 5 has an effect on the tangential air flow tv of the rotating filter element 2; 20. By means of the collar 5, the air flow tv and impurities contained therein, especially solid and light particles, are guided to proceed out of the air filter 1 by way of the annular gap 6 between the collar and a building surface, such as a wall or roof, co-directional with the aperture 4a.

Since the filter element 2; 20 is located in the space 50 defined by the collar 5, i.e. inside the collar 5, the tangential air flow generated by the rotating filter element 2; 20, and impurities possibly contained therein, are guided by means of the collar 5 into the annular gap 6 and further out of the air filter 1.

In the above-presented embodiments of the invention, it is essential to deny the access of small impurity particles, such as e.g. particles in size category 0,1-10 μm, into the ventilation duct. Accordingly, the air filter 1 is fitted e.g. in connection with the air intake of an inlet air duct outside a building, whereby it is important just to displace the impurities effectively and directly away from the immediate vicinity of the air filter. In particular, it should be noted that, even with a very large amount of particles, such as dust particles, the air filter will not be clogged as the particles have a designated direct exit route by way of the annular gap 6 to the outside of the air filter, e.g. into a vacant space. In addition, the air flow through the gap 6 away from the air filter is powerful, thus carrying light and solid particles along with it and preferably far away from the air filter. If the air filter is an enclosed unit, it is susceptible to become clogged by large amounts of particles.

In an alternative preferred embodiment of the invention, the annular gap 6 is connected to an appropriate collecting channel, and the latter e.g. to a particle collector or the like particle trap. The collecting channel comprises e.g. an annular channel fitted around the gap 6, and an extension channel interconnected therewith, the latter having a particle collector which is most preferably easy to replace and/or clean.

In a preferred embodiment of the invention, the perforated plate 20 is a straight panel 21 of equal thickness. In terms of its periphery 22, it is circular and provided with holes 23. The perforated plate has its holes 23 most preferably arranged on the panel 21 within an area 231 defined between radii R, r (cf. FIG. 2), wherein R is smaller than a radius a/2 of the panel (a=perforated plate's diameter). The first radius is e.g. in the order of 70-90% of the panel's diameter a, and the second radius is e.g. 10-20% of the panel's diameter a.

In a preferred embodiment of the invention, the perforated plate 20 is made of metal, such as stainless sheet steel. Alternatively, the perforated plate consists of e.g. aluminum sheet. It should be noted that also other generally employed metals and/or metal alloys are relevant. It should also be noted that other solid, preferably flexible materials are also applicable to the perforated plate, such as e.g. plastics like acryl and polycarbonate.

All in all, the perforated plate 20 making up the filter element 2 is implementable in a multitude of ways. The shape, size, number and disposition of holes in the perforated plate 20 can vary, and so can the perforated plate's diameter and aperture ratio, depending on the application. Various optional perforated plate configurations have been described in the present Applicant's European patent application EP 2275187.

In a preferred embodiment of the invention, the disc type filter element 2 consists of an air permeable rigid material. Being permeable to air results from the fact that the material has small structural holes, i.e. the holes have a diameter within the range of e.g. 10 μm to 10 mm, and the number of holes is sufficient not to generate a major pressure difference across the filter element when the air filter is in operation. Examples of filter element materials are, among others, a dense metal or plastic mesh and a filter cloth or the like.

The invention is not limited to concern just the above-described exemplary embodiment, but many modifications are possible while remaining within the scope of an inventive concept as defined in the claims.

The invention claimed is:

1. An air filter (1) which is intended for an air conditioning system, comprising:
    fastening means (7; 71) arranged to fasten the air filter (1) to a ventilation duct (4) with an inlet aperture (4a) having a duct inlet edge;
    a power unit (3) located within the fastening means (7;71; 73) and having a shaft (32) extending out of the fastening means (7;71;73) and being connected to a filter element (2; 20);
    a ring type collar (5) having a collar outlet edge at a first end (52) thereof and a collar inlet edge at a second end thereof, the collar being outside and concentric with the ventilation duct (4); and
    the disc type filter element (2; 20) connected to the shaft (32) and disposed inside a space (50) defined within the collar (5), the filter element (2; 20) being located at a first distance (s) from the duct inlet edge and concentrically with the ventilation duct (4),
    wherein the collar outlet edge is spaced apart from the duct inlet edge at a second distance (k),
    wherein the first distance (s) is larger than the second distance (k), and
    wherein said ventilation duct (4) is supplied by way of air entering the collar via the collar inlet edge, being cleaning by the filter element (2; 20), leaving the collar via the collar outlet edge, and entering the ventilation duct (4) via the duct inlet edge.

2. The air filter according to claim 1, wherein the second end (52) of the collar (5) has a diameter (h2) which is equal to or larger than a diameter (a) of the ventilation duct (4).

3. The air filter (1) according to claim 1, wherein the collar (5) is adapted to widen towards the inlet aperture (4a).

4. The air filter (1) according to claim 1, wherein the collar (5) is in the shape of a truncated cone.

5. The air filter (1) according to claim 1, wherein the disc type filter element (2) is a perforated plate (20), which is a straight panel of equal thickness.

6. The air filter (1) according to claim 5, wherein the perforated plate (20) consists of metal.

7. The air filter (1) according to claim 1, wherein the disc type filter element (2) consists of an air permeable rigid material.

8. The air filter (1) according to claim 1, wherein the disc type filter element (2) comprises an air permeable rigid material with holes having a diameter within a range of 10 μm to 10 mm.

9. The air filter (1) according to claim 1, wherein the filter element rotates at 500-3000 revolutions/minute, and the filter element denies access of particles in size from 0.1-10 μm into the ventilation duct.

10. An air filter (1) which is intended for an air conditioning system, comprising:
    fastening means (7; 71) arranged to fasten the air filter (1) to a ventilation duct (4) with an inlet aperture (4a) having a duct inlet edge;
    a power unit (3);
    a ring type collar (5) having a collar outlet edge at a first end (52) thereof and a collar inlet edge at a second end thereof, the collar being outside and concentric with the ventilation duct (4); and
    a disc type filter element (2; 20) driven by the power unit and disposed inside a space (50) defined within the collar (5), the filter element (2; 20) being located at a first distance (s) from the duct inlet edge and concentrically with the ventilation duct,
    wherein the collar outlet edge is spaced apart from the duct inlet edge at a second distance (k),
    wherein the first distance (s) is larger than the second distance (k), and
    wherein said ventilation duct (4) is supplied by way of air entering the collar via the collar inlet edge, being cleaning by the filter element (2; 20), leaving the collar via the collar outlet edge, and entering the ventilation duct (4) via the duct inlet edge.

11. The air filter according to claim 10,
    wherein the power unit (3) is located within the fastening means (7, 71, 73) and having a shaft (32) extending out of the fastening means (7, 71, 73) and being connected to a filter element (2, 20).

12. The air filter according to claim 10, wherein the second end (52) of the collar (5) has a diameter (h2) which is equal to or larger than a diameter (a) of the ventilation duct (4).

13. The air filter (1) according to claim 10, wherein the collar (5) is adapted to widen towards the inlet aperture (4a).

14. The air filter (1) according to claim 10, wherein the collar (5) is in the shape of a truncated cone.

15. The air filter (1) according to claim 10, wherein the disc type filter element (2) is a perforated plate (20), which is a straight panel of equal thickness.

16. The air filter (1) according to claim 15, wherein the perforated plate (20) is metal.

17. The air filter (1) according to claim 10, wherein the disc type filter element (2) consists of an air permeable rigid material.

18. The air filter (1) according to claim 10, wherein the disc type filter element (2) comprises an air permeable rigid material with holes having a diameter within a range of 10 μm to 10 mm.

19. The air filter (1) according to claim 10, wherein the filter element rotates at 500-3000 revolutions/minute, and the filter element denies access of particles in size from 0.1-10 μm into the ventilation duct.

20. The air filter (1) according to claim 11, wherein,
the filter element rotates at 500-3000 revolutions/minute,
the collar (5) widens towards the inlet aperture (4*a*), and
the collar (5) has a truncated cone shape.

\* \* \* \* \*